US009021599B2

(12) United States Patent
Krieger et al.

(10) Patent No.: US 9,021,599 B2
(45) Date of Patent: Apr. 28, 2015

(54) PROTECTING PRIVACY VIA A GATEWAY

(71) Applicant: Google Inc., Mountain View, CA (US)

(72) Inventors: Ken Krieger, Jackson, WY (US); Andrew Joseph Alexander Gildfind, London (GB); Nick Salvatore Arini, Southampton (GB); Simon Michael Rowe, Berkshire (GB); Raimundo Mirisola, Zug (CH)

(73) Assignee: Google Inc., Mountain View, CA (US)

( * ) Notice: Subject to any disclaimer, the term of this patent is extended or adjusted under 35 U.S.C. 154(b) by 72 days.

(21) Appl. No.: 13/799,538

(22) Filed: Mar. 13, 2013

(65) Prior Publication Data

US 2015/0067869 A1  Mar. 5, 2015

(51) Int. Cl.
*G06F 21/00* (2013.01)
*H04L 29/06* (2006.01)
*G06F 21/31* (2013.01)

(52) U.S. Cl.
CPC .............. *H04L 63/04* (2013.01); *H04L 63/08* (2013.01); *G06F 21/31* (2013.01); *H04L 63/102* (2013.01); *H04L 63/083* (2013.01)

(58) Field of Classification Search
CPC ......... G06F 21/31; H04L 63/08; H04L 63/83; H04L 63/102; H04L 63/04
USPC ........................................................... 726/26
See application file for complete search history.

(56) References Cited

U.S. PATENT DOCUMENTS

| 7,020,774 | B1 * | 3/2006 | Cornuejols et al. | 713/176 |
|---|---|---|---|---|
| 7,941,562 | B2 | 5/2011 | Cheng et al. | |
| 2001/0049620 | A1 | 12/2001 | Blasko | |
| 2004/0015719 | A1 * | 1/2004 | Lee et al. | 713/201 |
| 2004/0098623 | A1 * | 5/2004 | Scheidell | 713/201 |
| 2007/0219910 | A1 * | 9/2007 | Martinez | 705/51 |
| 2007/0233857 | A1 * | 10/2007 | Cheng et al. | 709/224 |
| 2009/0247193 | A1 | 10/2009 | Kalavade | |
| 2010/0222036 | A1 | 9/2010 | Wormald et al. | |
| 2011/0055014 | A1 | 3/2011 | Kim | |
| 2013/0191904 | A1 * | 7/2013 | Piliouras | 726/7 |
| 2013/0198383 | A1 * | 8/2013 | Tseng et al. | 709/225 |
| 2013/0268994 | A1 * | 10/2013 | Cooper et al. | 726/1 |

* cited by examiner

*Primary Examiner* — Hadi Armouche
*Assistant Examiner* — Shahriar Zarrineh
(74) *Attorney, Agent, or Firm* — Foley and Lardner LLP; John D. Lanza

(57) ABSTRACT

A system and methods for protecting privacy via a gateway are provided. The system includes a data store comprising a computer readable medium storing a program of instructions for performing the protection of privacy via the gateway; a processor that executes the program of instructions; an event detection unit to detect an event behind the gateway; a correlation unit to detect a source associated with the detected event; a semi-stable identification unit to assign a semi-stable identification for the associated source with the detected event; a vector assigning unit to assign a vector to data associated with the semi-stable identification, the vector being related to the source independent any personal identification information (PII); and a communication unit to transmit the vector to instigate an action.

15 Claims, 5 Drawing Sheets

PROTECTING PRIVACY VIA A GATEWAY

BACKGROUND

A location may contain several devices that are capable of accessing an external network, such as a personal computer, laptop, netbook, tablets, smart phones, and Internet Protocol televisions (IPTV), for example. Each device associated with the location may access the external network via a gateway (such as a router). Thus, all requests to the external network, and data provided from the external network may go through the gateway. The devices may be referred to as being "behind" the gateway.

An Internet user employs an application on one of the devices, such as a web browser, to access various web sites. The web browser communicates a universal resource locater (URL) request to a server, the server retrieves content from a content provider based on the requested URL, and delivers the content to the web browser. The content may be sourced from a single source, or be an amalgamation of data from multiple sources.

In certain situations, the content may include shared content. The shared content may be provided from the content provider. Alternatively, a third-party provider, such as an online shared content network may provide shared content to be included with content displayed on a web browser, or any media consuming device.

In order to maximize the effectiveness of the shared content, various techniques may be employed. One example is to attempt to ascertain Internet users with the highest likelihood of clicking-through the shared content. If non-germane shared content is provided to the Internet user, the Internet user may not click-through the shared content. Other metrics may be employed to determine if shared content is germane to the user.

Various techniques may be employed to ensure that the shared content served to the Internet user is germane. For example, if the Internet user is viewing content related to sports, a shared content provider may serve shared content related to the purchase of sporting goods.

Alternatively, data associated with the Internet user's web browser may be utilized as well. Web browsers include a cookie. A cookie is a file that records previously visited web sites by the web browser. Thus, the cookie may be viewed as a key to viewing the Internet user's activity associated with a server. Each web site may have a cookie associated with the web site.

Online social networks may store information about the Internet user, and use this information to serve shared content to the Internet user. For example, the Internet user may indicate certain attributes about themselves or preferences, such as interests, sex, beliefs, or other information that aids in the shared content being selected to be served to the Internet user.

Various other techniques also may be employed that are closely related to analyzing the Internet user's behavior. For example, an online shared content network may employ search terms or keywords entered by the Internet user to select shared content to be served to the Internet user. Additionally, a social network may contain information about how the various users of the social network communicate and interact with each other.

A third-party may be interested in measuring the effectiveness of the shared content. By measuring the effectiveness of the shared content, an online shared content network may serve the Internet user shared content that will be clicked-through.

In measuring the effectiveness of the shared content, several metrics may be employed. For example, a server measuring the effectiveness of the shared content may monitor a unique number of Internet users who access the server. Alternatively, the server may record the frequency of views for a specific shared content item. Or the server may determine the effectiveness of the shared content by the number of Internet users who click-through the shared content.

Due to the fragmented nature of information, various aspects about the Internet user may be distinctly located at various sources, such as various social networks or other web sites. Thus, serving shared content, while measuring the shared content's effectiveness may be difficult.

The Internet users associated with the location may desire to not have their personal identification information (PII) transmitted to the external network. Thus, the ability to serve effective shared content without the knowledge of PII associated with the Internet user becomes difficult.

SUMMARY

A system and methods for protecting privacy via a gateway are provided. The system includes a data store comprising a computer readable medium storing a program of instructions for performing the protection of privacy via the gateway; a processor that executes the program of instructions; an event detection unit to detect an event behind the gateway; a correlation unit to detect a source associated with the detected event; a semi-stable identification unit to assign a semi-stable identification for the associated source with the detected event; a vector assigning unit to assign a vector to data associated with the semi-stable identification, the vector being related to the source independent any personal identification information (PII); and a communication unit to transmit the vector to instigate an action.

DESCRIPTION OF THE DRAWINGS

The detailed description refers to the following drawings, in which like numerals refer to like items, and in which.

DETAILED DESCRIPTION

An online shared content network may serve shared content relevant to an Internet user. In doing so, the Internet user becomes susceptible to person identification information (PII) being leaked to the online shared content network. For example, because the online shared content network may be privy to the cookies that generated the shared content from the online shared content network, the online shared content network may be able to ascertain data associated with the web browsing activities of the source of the cookie.

The Internet user may access the online shared content network through a device located behind a gateway. The gateway may serve as a portal to the external network, and subsequently to the online shared content network. The Internet user may desire that PII not be transmitted without express authority outside the confines of the location. Thus, serving the Internet user with shared content may be difficult, as the online shared network may not have the capability to serve the Internet user with effective shared content.

The methods and systems disclosed herein are directed to protecting privacy via a gateway. The gateway ensures that PII associated with the various Internet users at the location is not compromised. The gateway ensures that shared content that is relevant to the Internet user is served. Further, the gateway may interact with a measurement server, thereby ensuring that an accurate measurement associated with Internet user's consumption of the shared content is maintained.

In situations in which the systems discussed here collect personal information about users, or may make use of personal information, the users will be provided with an opportunity to control whether programs or features collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user will have control over how information is collected about the user and used by a content server.

Figure 1:
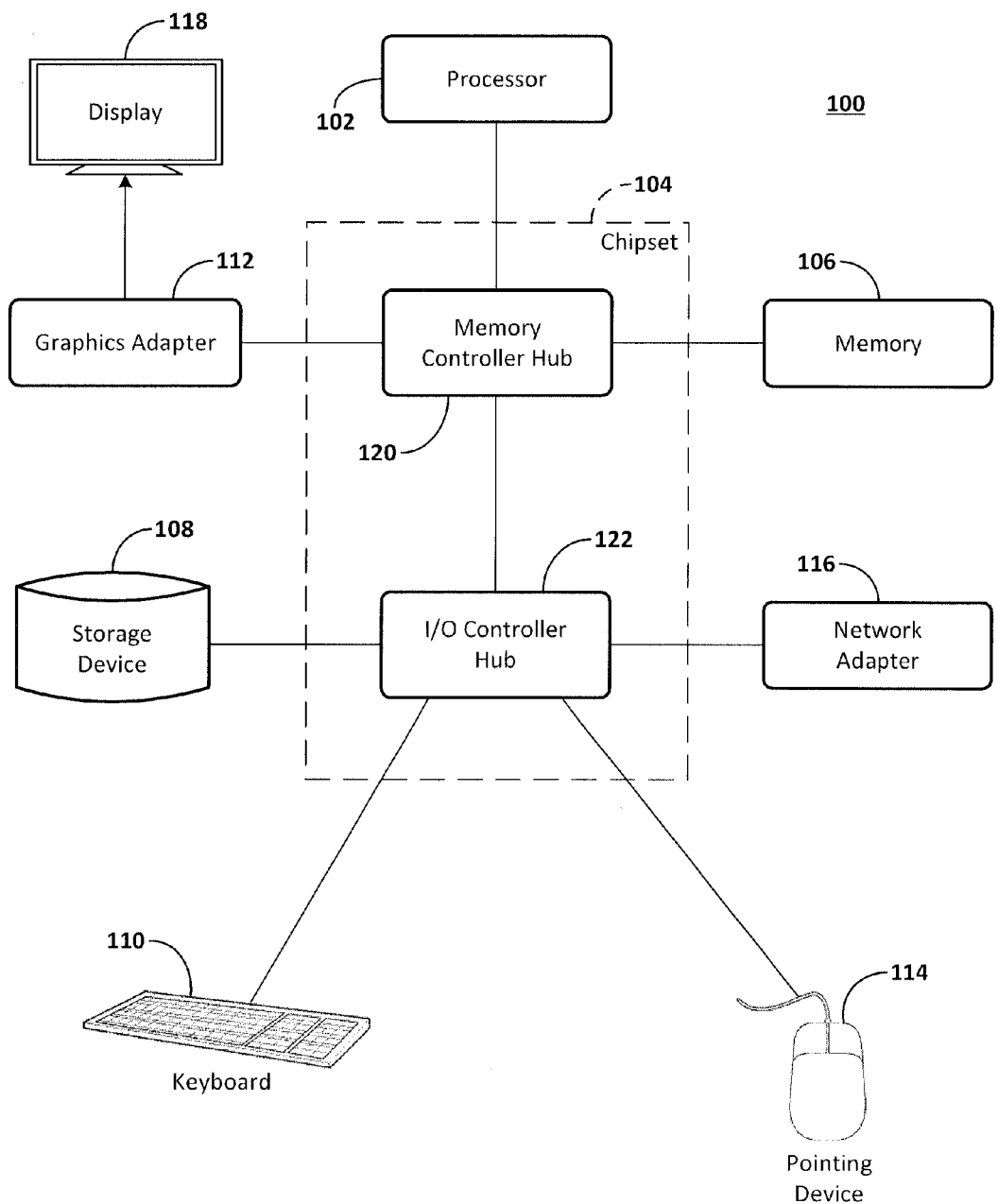
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. For example, a data store, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
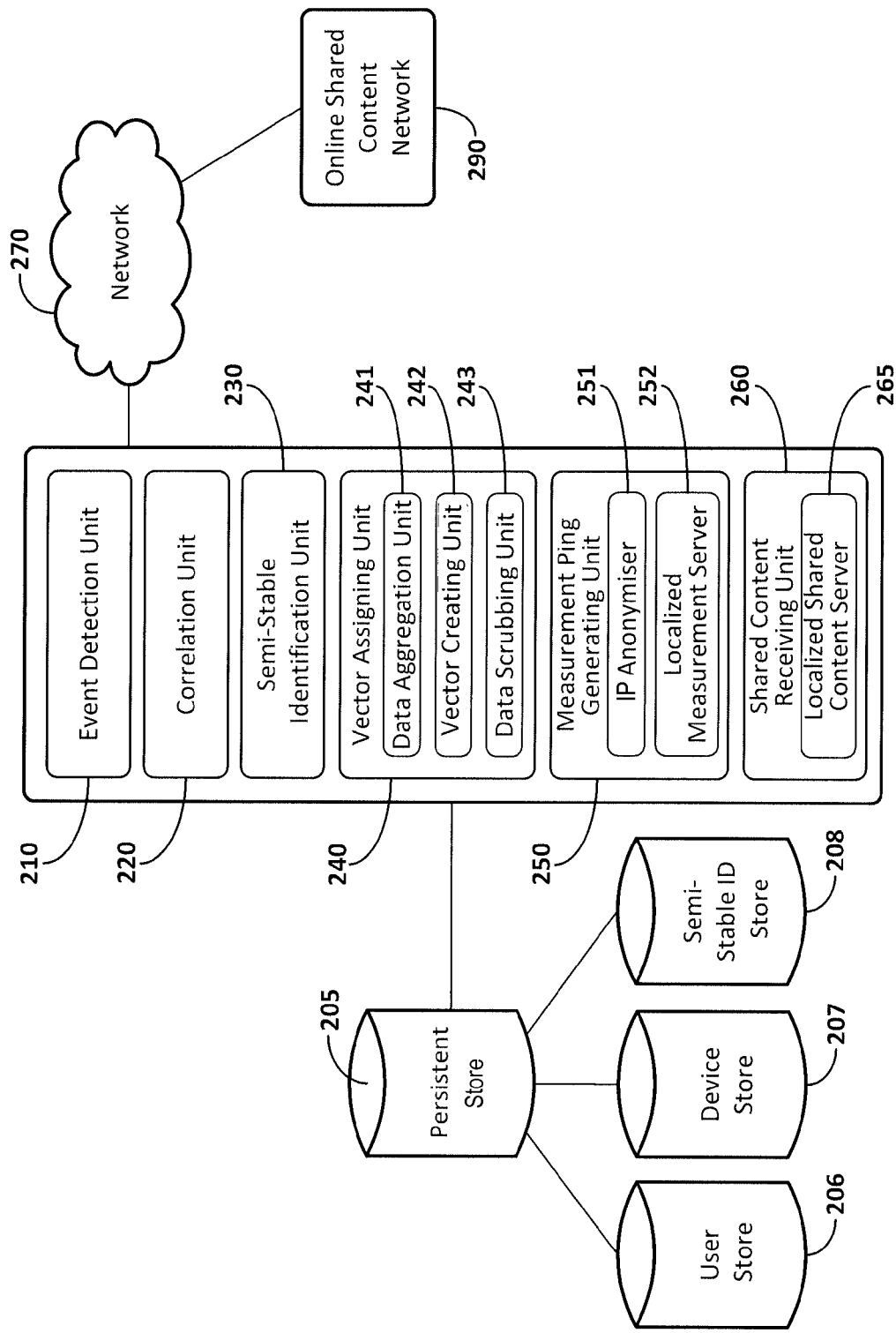
FIG. 2 illustrates an example of a system for protecting privacy via a gateway.

FIG. 2 illustrates a system for protecting privacy via a gateway. The system 200 includes an event detection unit 210, a correlation unit 220, a semi-stable identification unit 230, a vector assigning unit 240, a measurement ping generating unit 250, and a shared content receiving unit 260. The system 200 may be implemented on the computer 100. As shown in FIG. 2, the system 200 communicates with and stores data in a persistent store 205. The persistent store 205 is shown as discrete from system 200. Alternatively, the persistent store 205 may be integrated with system 200. The persistent store may be any data storage device, such as the ones enumerated in reference to data store 108.

The system 200 may be implemented as part of a router or an access point associated with the gateway for the location, or as a stand-alone component. The system 200 may communicate via a network 270, such as the Internet, to various data providers, measurement servers, an online shared content network 290.

The event detection unit 210 detects events associated with a device behind the gateway. For example, the event may be a media consumption event. A media consumption event may be any request for media by a device behind the gateway from the external network. Thus, an event may correspond to a request for media from an external web site.

In another example, the event may be a user accessing a device behind the gateway to access media via an IPTV. An event may be the actual media consumption or a change from consuming a first media item to a second media item.

The event may also be a request for shared content. For example, a media consumer may access content that retrieves shared content from an online shared content network. Alternatively, an application associated with a device behind the gateway may request shared content to augment a user's interaction with the consumption of media.

The correlation unit 220 correlates the detected media consumption event or request with the device in which a user employs to access the content or shared content. The correlation unit 220 may store the correlation in the persistent store 205. The correlation unit 220 may correlate the event in at least three different ways. If the system 200 is able to detect a specific user associated with the event, previously registered in a user store 206, the correlation unit 220 may correlate the detected event with the specific user (full attribution). If the system 200 is able to detect a specific device associated with the event, previously registered in a device store 207, the correlation unit 220 may correlate the detected media consumption event with the specific device (partial attribution). Furthermore, the system 200 may not be able to detect the device (unknown attribution).

The semi-stable identification unit 230 assigns a semi-stable identification to each full attribution, partial attribution or unknown attribution. Thus, every time an event is detected by the event detection unit 210, a data entry associated with the semi-stable identification may be updated. The semi-stable identification and associated data may be stored in a semi-stable identification store 208.

The semi-stable identification may be updated periodically, based on a predetermined time interval. Thus, because the various users and devices are dynamically switched, a non-trusted third party source may not be able to infer that a semi-stable identification corresponds to a specific user or device.

The vector assigning unit 240 includes a data aggregation unit 241, a vector creation unit 242, and a data scrubbing unit 243. The vector assigning unit 240 assigns a vector for each semi-stable identification respectively, and may update the respective vector based on a detected media consumption event.

The data aggregation unit 241 aggregates data from various data providers. The data providers may be a social network, a blog, or any web site in which the user, the device or the unattributed source maintains information about their activities or interests.

Additionally, the data aggregation unit 241 may monitor the media consumed by the user, the device or the unattributed source. Thus, media of a specific scope may be associated with the user, device or the unattributed source.

The vector creation unit 242 creates a vector from the information aggregated by the data aggregation unit 241. The vector may contain information such as sex, age, interest and activities. The vector may be communicated to a third-party, such as an online shared content network 290, thereby instigating a retrieval of shared content based on the information aggregated.

The data scrubbing unit 243 scrubs PII associated from the vector. Thus, any party that receives the vector may not be able to glean any PII associated with the vector.

The measurement ping generation unit 250 transmits the information associated with each semi-stable identification along with the corresponding assigned vector to a measurement server. Thus, the measurement server may be able to record general information, i.e. that a 'male ages 18-24 who likes basketball' consumed media events X, Y and Z. Further, this recordation is performed without any PII being transmitted past the confines of the gateway to the measurement server. The information transmitted by the measurement ping generation unit 250 may be transmitted in either real-time or in batches.

Additionally, the measurement ping generation unit 250 may include an IP anonymiser 251. The IP anonymiser 251 may scrub the transmitted information of an IP address, time stamps or other information that may identify a user or device. The IP anonymiser 251 is shown integrated with the measurement ping generation unit; however, the function of scrubbing may be performed by a proxy located in between the gateway and the measurement server.

Additionally, the measurement ping generation unit 250 may include a localized measurement server 252. The gateway may communicate with devices outside the location, and in the same way that users or devices are anonymized internally, the localized measurement server 252 may perform the same operations. Thus, the localized measurement server 252 may measure the media consumption of devices external to the location.

The shared content receiving unit 260 may communicate with the online shared content network 290 to retrieve shared content related to the vector. The shared content receiving unit 260 may augment content being consumed by a user or device with the retrieved shared content. In this way, the user or device is served shared content without transmitting PII to the online shared content network 290.

The shared content receiving unit 260 may include a localized share content server 265. The shared content receiving unit 260 may retrieve a bundle of shared content items corresponding to various vectors sourced from the vector assigning unit 240. The localized shared content server 265 may then store the shared content, with each of the stored shared content items being assigned to a semi-stable identification (or plurality of semi-stable identifications) based on the source (i.e. user or device) vector used to retrieve the shared content.

The localized shared content server 265 then may distribute the appropriate shared content to the user or device requesting shared content.

System 200 may be implemented for measuring media consumption, retrieving shared content or both. If System 200 is implemented for only measuring, system 200 may be implemented independent of the shared content receiving unit 260. Alternatively, if system 200 is implemented only for retrieving shared content, system 200 may be implemented independent of the measurement ping generation unit 250.

Figure 3:
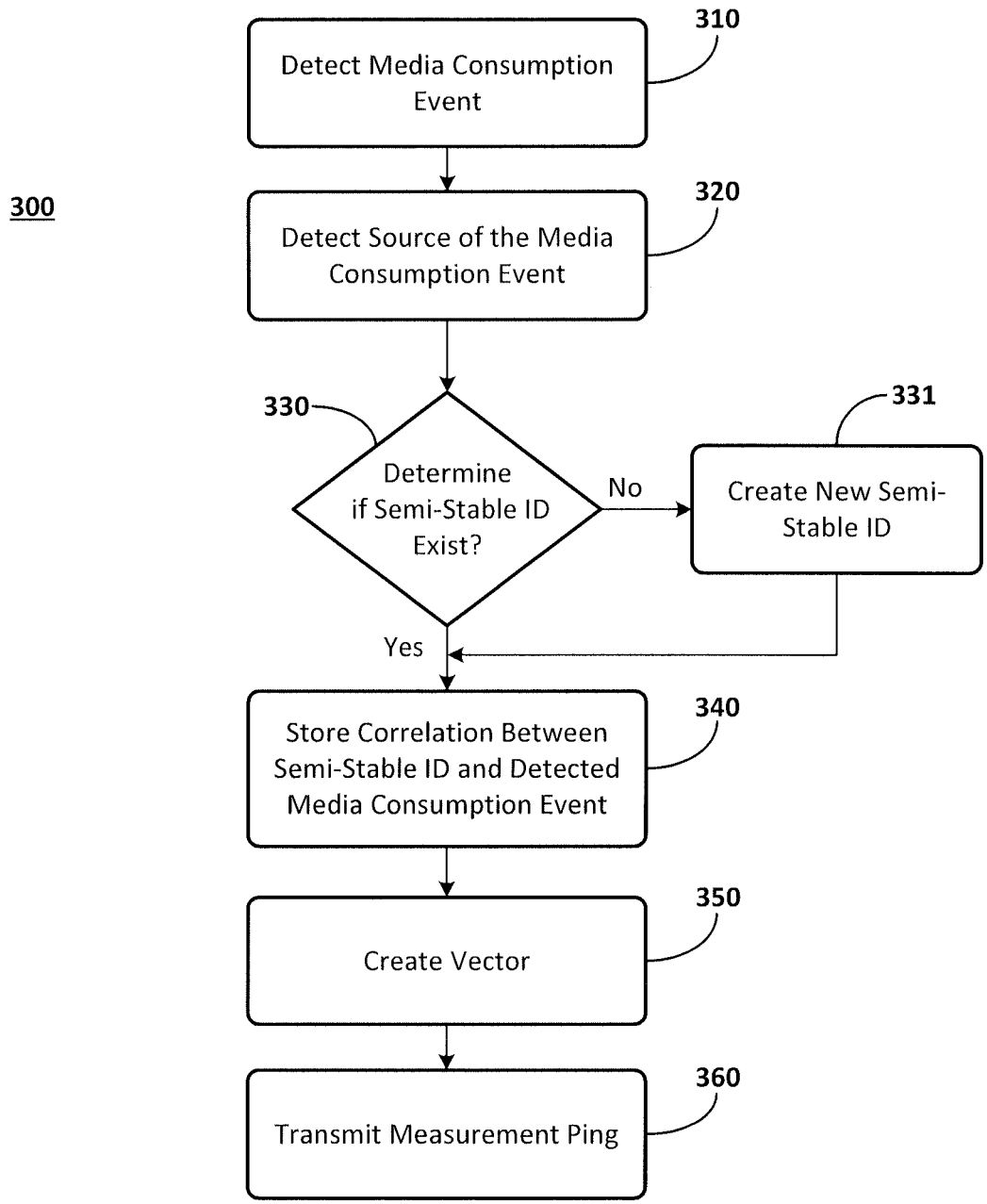
FIG. 3 illustrates an example of a method for measuring media consumption via a gateway.

FIG. 3 is a method 300 for measuring media consumption via a gateway. The method 300 may be implemented on system 200.

In operation 310, a media consumption event is detected by a gateway. The media consumption event may refer to the action of any device behind a location serviced by the gateway accessing an external network for media. The media consumption event may include accessing a web site, accessing an Internet radio station, accessing a television program, for example.

In operation 320, the detected media consumption event is correlated to a specific source. If the source is attributed to a user, the detected media consumption event is attributed to the user (full attribution). If the source is a device, the detected media consumption event is attributed to the device (partial attribution). If the source is unknown, an unknown attribution is made (unknown attribution).

In operation 330, a determination is made if a semi-stable identification exists for the source used for the attribution in operation 320. If a semi-stable identification exists for the attribution, the method 300 proceeds to operation 340. If a semi-stable identification does not exist, a new semi-stable identification is created in operation 331.

In operation 340, the detected media consumption event with the correlated attributed source is stored with the corresponding semi-stable identification. The semi-stable identification may be randomized or rotated, thereby preventing a non-trusted third party source from determining that a semi-stable identification corresponds with a specific user or device.

In operation 350, a vector associated with the attributed source may be created. The vector may be created in a similar fashion as described with vector assigning unit 240. Thus, a vector is created independent of any PII. The vector may be updated with the detected media consumption event. For example, if the detected media consumption event is a sporting event, the vector may indicate that the attributed user or device enjoys sports.

In operation 360, the vector may be transmitted to a measurement server along with the detect media consumption event (via a measurement ping). Thus, the measurement server may be cognizant of a user matching the profile associated with the vector, while not being able to glean any sort of PII associated with the specific user. Prior to the measurement ping being transmitted, information such as an IP address, time stamps or other information that may identify a user or device may be scrubbed.

Thus, a measurement server is able to record media consumption without users or devices behind a location being required to compromise PII.

Figure 4:
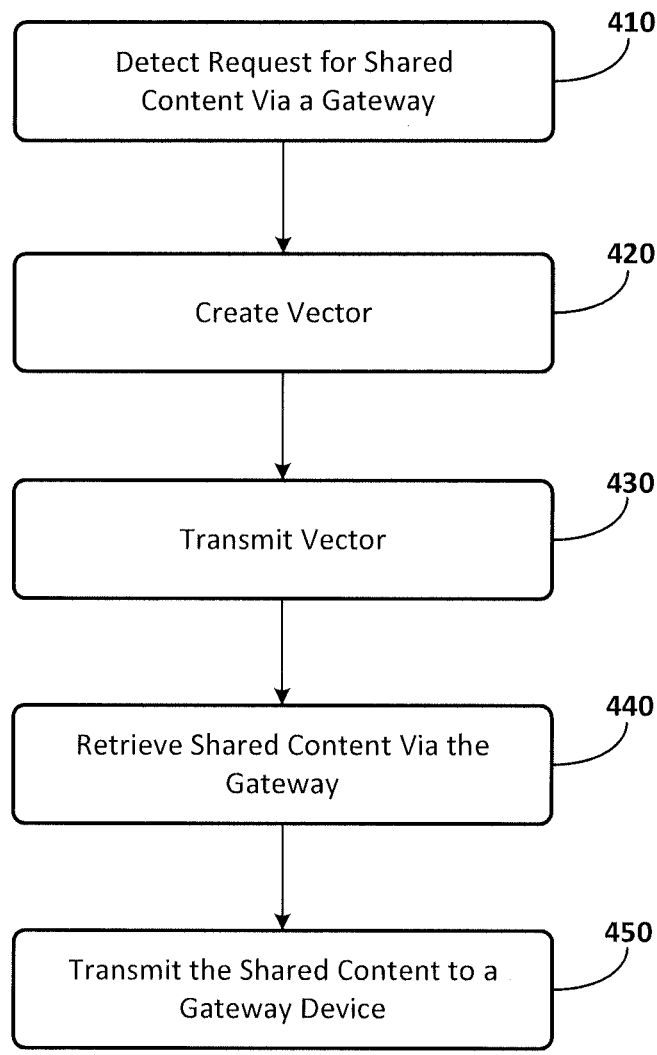
FIG. 4 illustrates an example of a method for receiving shared content via a gateway.

FIG. 4 is a method 400 for retrieving shared content via a gateway. The method 400 may be implemented on the system 200.

In operation 410, a request is made for shared content from a device that accesses a network from behind the gateway. For example, a user or device may be accessing content served alongside shared content. Thus, the retrieval of the shared content may augment the presentation of the content.

In operation 420, a vector associated with the source of the request in operation 410 is created. The vector may be created in a similar fashion as described with vector assigning unit 240. Thus, a vector is created independent of any PII. The vector may be updated with the detected media consumption event by an operation similar to operation 310. For example, if the detected media consumption event is a sporting event, the vector may indicate that the attributed user or device enjoys sports.

In operation 430, the vector is transmitted to an online shared content network. Similar to operation 360, the vector may be scrubbed of certain information, such as an IP address, time stamps or other information that may identify a user or device.

In operation 440, the gateway retrieves the shared content based on the vector created in operation 430. The gateway may retrieve a bundle of shared content items for the plurality of users or devices associated with a location. Thus, alternatively, the gateway may serve as a localized shared content server.

In operation 450, the gateway transmits the retrieved shared content to the source of the request in operation 410. The source, i.e. a user or device, then may server the shared content in conjunction with the content being served. Thus, shared content relevant to the user or device is served, while no PII is transmitted outside the confines of the gateway.

Figure 5:
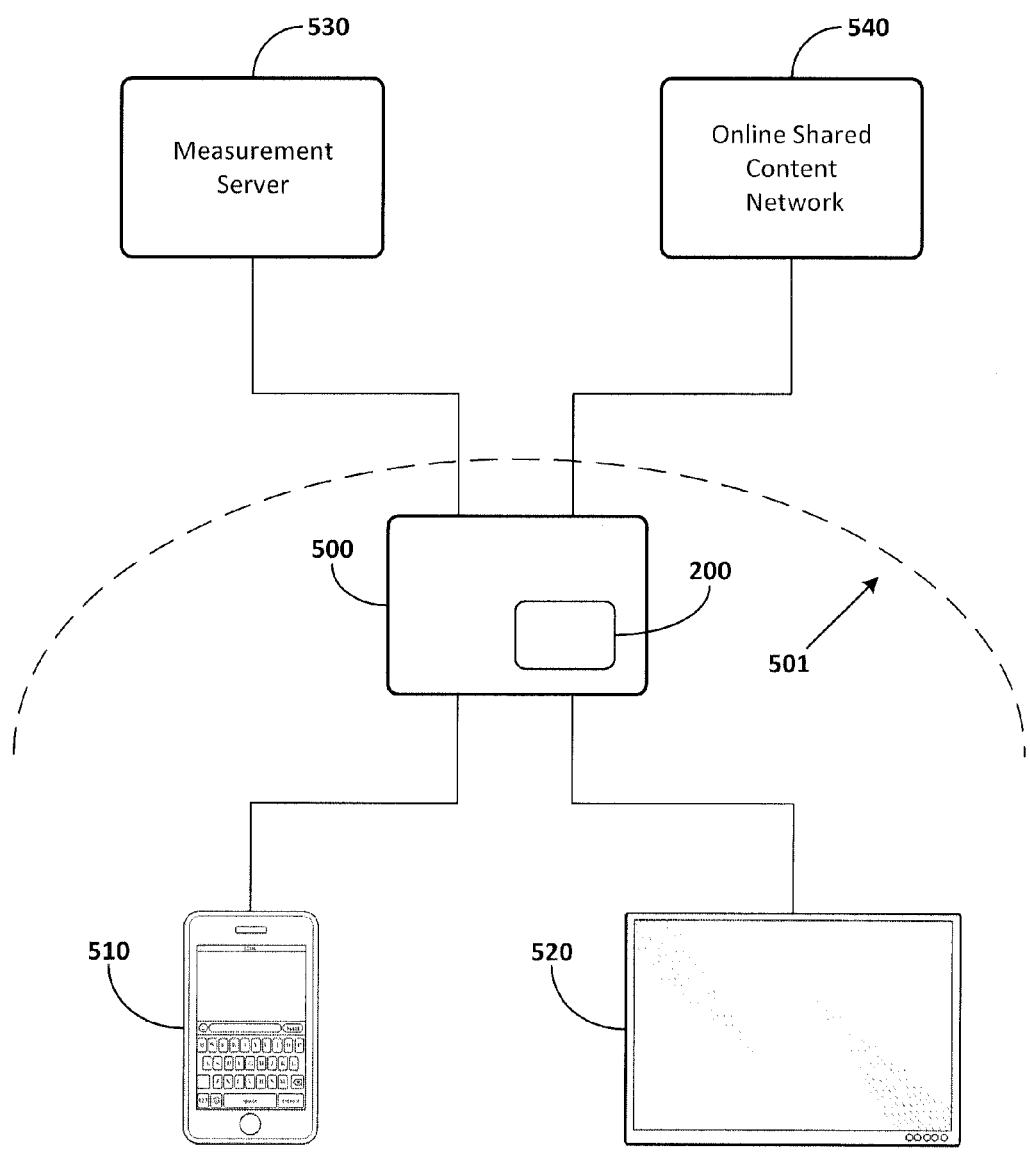
FIG. 5 is an example of an implementation of the system of FIG. 2 at a location employing a gateway to access a network.

FIG. 5 is an example of an implementation of system 200 at a location 501. The location 501 includes a gateway 500, a smart phone 510 and an IPTV 520. The gateway 500 serves as an intermediary between the devices behind location 501 and an external network. Via the external network, the included devices may communicate with a measurement server 530 and an online shared content network 540.

The gateway may detect that one of the devices, such as the smart phone 510 or the IPTV 520, is consuming media. Thus, employing system 200, the gateway 500 may indicate general information about the user of smart phone 510 or the IPTV 520 (without indicating any sort of PII) and the media being consumed to a measurement server 530, without transmitting any PII associated with the user.

In another example, if the IPTV 520 is being employed to view content, and the content is augmented with shared content, the IPTV 520 may request the gateway 500 to retrieve shared content. Thus, employing system 200, the gateway 500 may retrieve shared content from the online shared content network 540 without transmitting any PII associated with the user of IPTV 520.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 3 and 4. The disclosed devices, components, and systems contemplate using or implementing any suitable technique for performing the steps illustrated in these figures. Thus, FIGS. 3 and 4 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system for protecting privacy via a gateway, comprising:
    a data store comprising a computer readable medium storing a program of instructions for performing the protection of privacy via the gateway; and
    a processor that executes the program of instructions, the processor including:
        an event detection circuit to detect a request for media from an external website by a device behind the gateway from an external network;
        a correlation circuit to detect a source associated with the detected request for media, and store a correlation between the source and the request in the data store;
        a semi-stable identification circuit to assign a semi-stable identification to the correlation, store the semi-stable identification in the data store, and periodically update the semi-stable identification;
        a vector assigning circuit to aggregate data associated with the source from a first data provider, create a vector from the aggregated data, scrub the vector of any personal identification information (PII), and assign the semi-stable identification to the vector;
        a communication circuit to transmit the vector to a measurement server;
        a shared content receiving circuit to receive shared content related to the vector; and
        a localized shared content server to distribute the shared content to the source.

2. The system according to claim 1, wherein the source is a user or a device.

3. The system according to claim 2, wherein the vector assigning circuit receives data about the source from the first data provider and a second data provider.

4. The system according to claim 3, wherein the communication circuit further comprises an IP anonymiser to scrub data indicating an identification associated with the gateway.

5. The system according to claim 3, wherein the measurement server is localized.

6. The system according to claim 3, wherein the measurement server is localized to the system.

7. The system according to claim 3, wherein the communication circuit transmits the vector to an online shared content network, and receives shared content from the online shared content network.

8. The system according to claim 7, wherein the online shared content network is localized to the system.

9. A method implemented on a processor for measuring media consumption via a gateway, comprising:
    detecting using the processor, a request for media from an external website by a device behind the gateway from an external network;
    correlating using the processor, a source associated with the request for media and storing a correlation between the source and the request in a data store;
    assigning using the processor, a semi-stable identification to the correlation;
    storing using the processor, the correlation in the data store;
    updating using the processor, the semi-stable identification periodically;
    aggregating using the processor, data associated with the source from a first data provider;
    creating using the processor, a vector from the aggregated data;
    scrubbing using the processor, the vector of any personal identification information (PII);
    assigning using the processor, the semi-stable identification to the vector;
    transmitting using the processor, the vector to a measurement server;
    receiving using the processor, shared content related to the vector; and
    distributing using the processor, the shared content to the source.

10. The method according to claim 9, wherein the source is a user or a device.

11. The method according to claim 9, wherein the retrieving of data further comprises retrieving data about the source from a second data provider.

12. The method according to claim 9, wherein the transmission of the vector further comprises scrubbing data indicating an identification associated with the gateway.

13. The method according to claim 9, wherein the measurement server is localized to a device implementing the method.

14. The method according to claim 9, further comprising:
    transmitting the vector to an online shared content network; and
    receiving shared content from the online shared content network.

15. The method according to claim 14, wherein the online shared content network is localized to the system.

* * * * *